United States Patent
Bunker et al.

(10) Patent No.: US 6,644,921 B2
(45) Date of Patent: Nov. 11, 2003

(54) COOLING PASSAGES AND METHODS OF FABRICATION

(75) Inventors: Ronald Scott Bunker, Niskayuna, NY (US); Bin Wei, Mechanicville, NY (US)

(73) Assignee: General Electric Company, Niskayuna, NY (US)

(*) Notice: Subject to any disclaimer, the term of this patent is extended or adjusted under 35 U.S.C. 154(b) by 45 days.

(21) Appl. No.: 10/010,549

(22) Filed: Nov. 8, 2001

(65) Prior Publication Data

US 2003/0086785 A1 May 8, 2003

(51) Int. Cl.⁷ .................................................. F01D 5/18
(52) U.S. Cl. ...................................................... 416/97 R
(58) Field of Search ................................. 415/115, 116, 415/177, 178; 416/96 A, 97 R

(56) References Cited

U.S. PATENT DOCUMENTS

| | | | |
|---|---|---|---|
| 6,006,823 A | 12/1999 | Kiknadze et al. | |
| 6,098,397 A | 8/2000 | Glezer et al. | |
| 6,119,987 A | 9/2000 | Kiknadze et al. | |
| 6,142,734 A | * 11/2000 | Lee | 416/97 R |
| 6,200,429 B1 | 3/2001 | Freyhof et al. | |
| 6,234,752 B1 | 5/2001 | Wei et al. | |
| 6,267,868 B1 | 7/2001 | Wei et al. | |
| 6,290,461 B1 | 9/2001 | Wei et al. | |
| 6,303,193 B1 | 10/2001 | Guida et al. | |

OTHER PUBLICATIONS

"Mass/Heat Transfer in Rotating Dimpled Turbine–Blade Coolant Passages", Sumanta Acharya and Fuguo Zhuo, Proceedings of the ASME Heat Transfer Division, 2000, vol. 3, pp. 51–60.

"Effect of Surface Curvature on Heat Transfer and Hydrodynamics Within a Single Hemispherical Dimple", N. Syred, A. Khalatov, A. Kozlov, A. Shchukin, R. Agachev, Proceedings of ASME Turboexpo 2000—May 8–11/2000 pp. 1–6.

"Heat Transfer Augmentation Using Surfaces Formed by a System of Spherical Cavities", M. Ya., Belen'Kiy, M.A. Gotovskiy, P.M. Lekakh, B.S. Fokin and K.S. Dolgushin, Heat Transfer Research, vol. 25, No. 2, 1993, pp. 196–203.

"Thermohydraulics of Flow Over Isolated Depressions (Pits, Grooves) in a Smooth Wall—" V.N. Afanas'Yev, V. Yu Veselkin, A.I. Leontiev, A.P. Skibin and YA. P. Chudnovskly—Heat Transfer Research, vol. 25, No. 1, 1993—pp. 22–56.

* cited by examiner

Primary Examiner—Edward K. Look
Assistant Examiner—Dwayne J. White
(74) Attorney, Agent, or Firm—Patrick K. Patnode; Christian G. Cabou

(57) ABSTRACT

A turbine portion, for example a turbine blade, for exposure in a hot fluid flow includes at least one internal cooling passage disposed therein. A cooling fluid is introduced within the cooling passage(s) to maintain the bulk temperature of the turbine portion at some acceptable temperature level. A plurality of concavities are disposed on the interior surface of the cooling passage. In one embodiment, the concavities are formed on the interior surface of cooling passage in an array pattern such that a spiral bulk fluid motion is obtained, similar to that which would be formed by a helical rib, but without the rib. The concavity surface pattern serves to enhance heat transfer to the same degree as the conventional rib rougheners, but with significantly less pressure loss due to friction. The spiral motion of the bulk cooling fluid also serves to recirculate central coolant to the heat transfer surface, thereby making the heat exchange process more effective than that for turbulated surfaces.

27 Claims, 8 Drawing Sheets

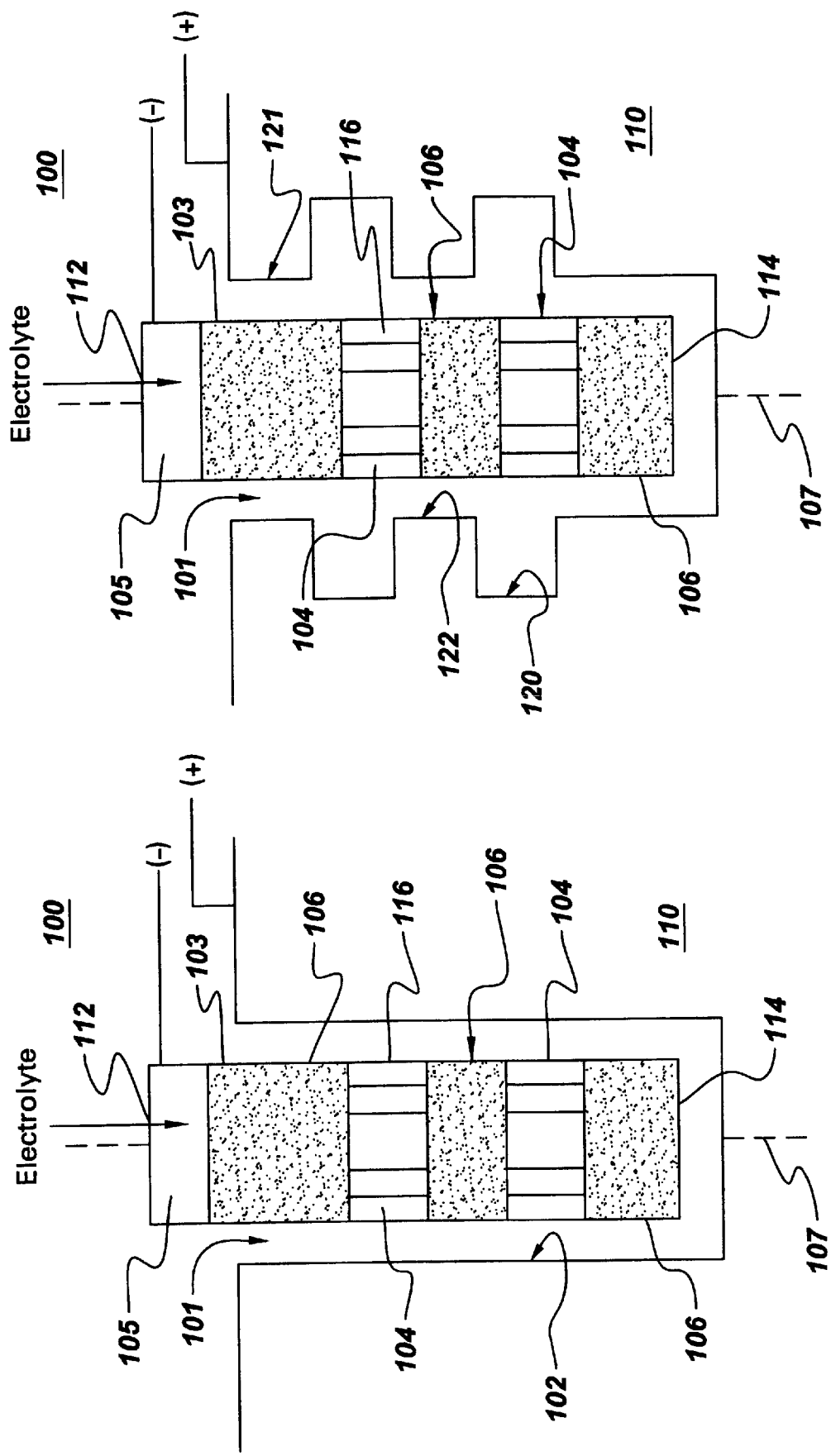

COOLING PASSAGES AND METHODS OF FABRICATION

BACKGROUND OF THE INVENTION

The present invention relates to cooling passages in hot component parts. More particularly, the present invention relates to improved cooling passages and methods of fabrication in, for example, turbine engine components.

In many current systems having cooled parts, for example gas turbine engines, the cooled hot gas path components typically use a variety of internal passages through which the cooling fluid is passed to maintain the bulk temperature of the part at some acceptable temperature level.

In many locations, these passages are of circular cross-section. For such circular passages, there are two main types of surfaces used for heat transfer, smooth surfaces and turbulated surfaces using transverse rib rougheners. An additional possible heat transfer enhancement surface is the use of a helical rib element within the circular passage, but this type of feature is not amenable to conventional investment casting, electro-discharge machining or electro-chemical machining methods.

There is a need in the art for improved cooling passages that provide improved heat transfer characteristics or improved pressure drop characteristics and there is an additional need for improved methods of fabricating these cooling passages.

BRIEF SUMMARY OF THE INVENTION

A turbine portion, for example a turbine blade, for exposure in a hot fluid flow includes at least one internal cooling passage disposed therein. A cooling fluid is introduced within the cooling passage(s) to maintain the bulk temperature of the turbine portion at some acceptable temperature level. A plurality of concavities are disposed on the interior surface of the cooling passage. In one embodiment, the concavities are formed on the interior surface of cooling passage in an array pattern such that a spiral bulk fluid motion is obtained, similar to that which would be formed by a helical rib, but without the rib. The concavity surface pattern serves to enhance heat transfer to the same degree as conventional rib rougheners, but with significantly less pressure loss due to friction. The spiral motion of the bulk cooling fluid also serves to recirculate central coolant to the heat transfer surface, thereby making the heat exchange process more effective than that for turbulated surfaces.

LIST OF FIGURES

Figure 4:
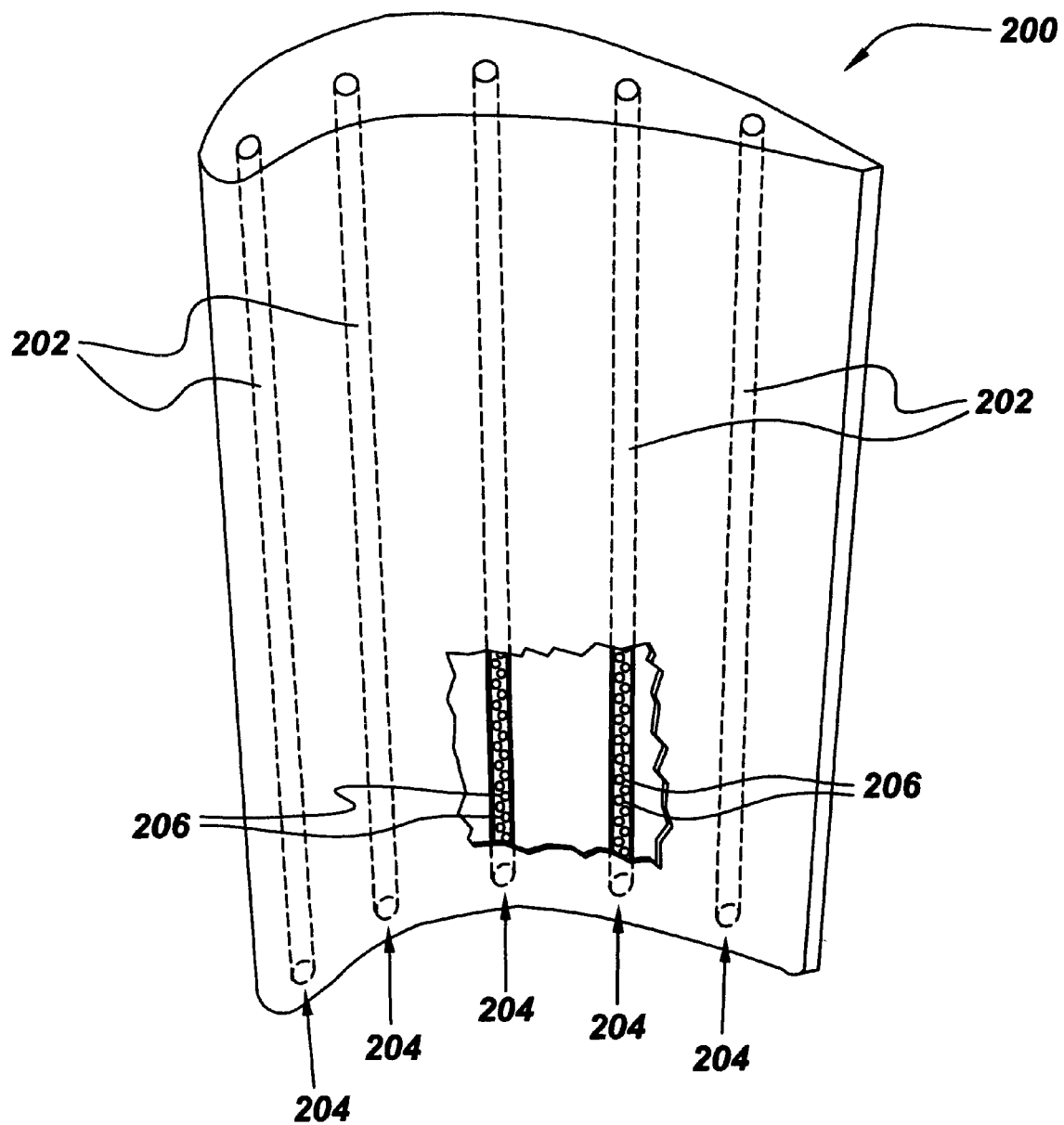

FIG. 4. is a schematic illustration, with parts removed of a representative turbine blade including a cooling passage arrangement in accordance with one embodiment of the instant invention.

Figure 5:
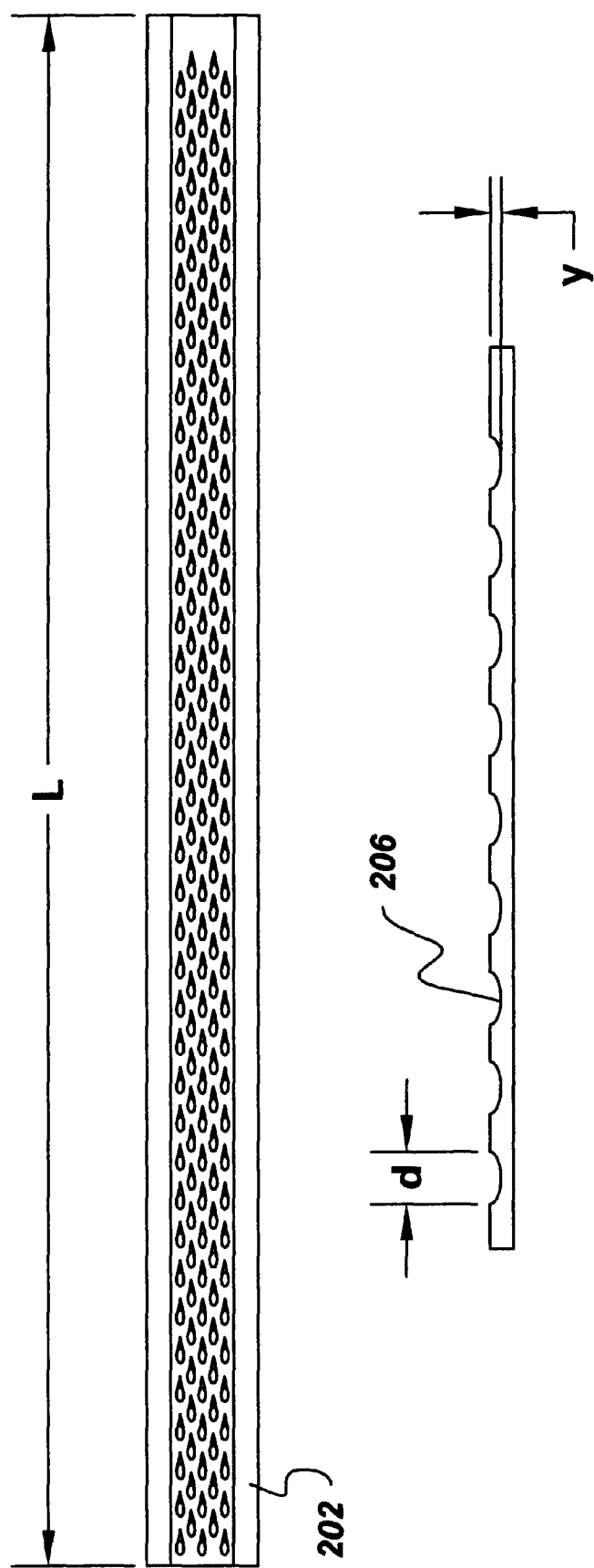

FIG. 5 is a schematic illustration of a cooling passage in accordance with one embodiment of the instant invention.

Figure 6:
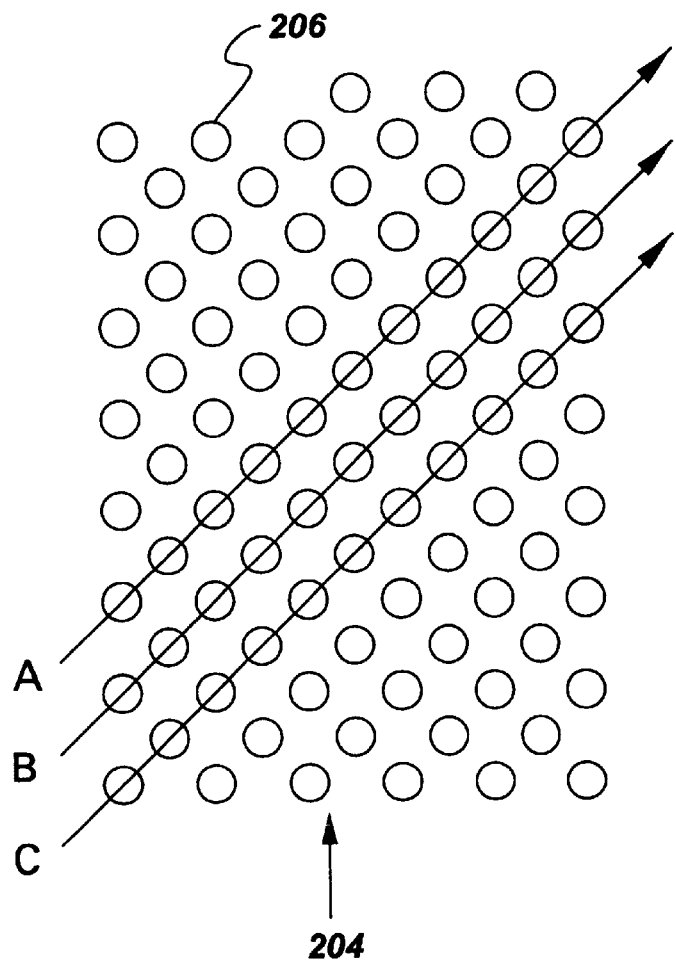

FIG. 6 is a concavity configuration in accordance with one embodiment of the instant invention.

Figure 7:
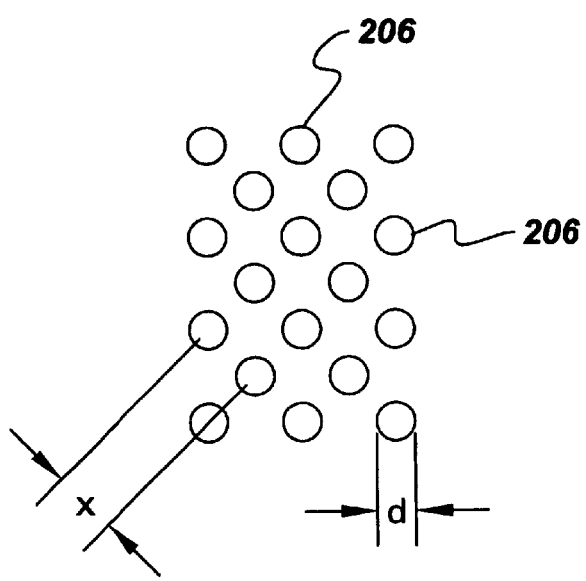

FIG. 7 is another concavity configuration in accordance with another embodiment of the instant invention.

Figure 8:
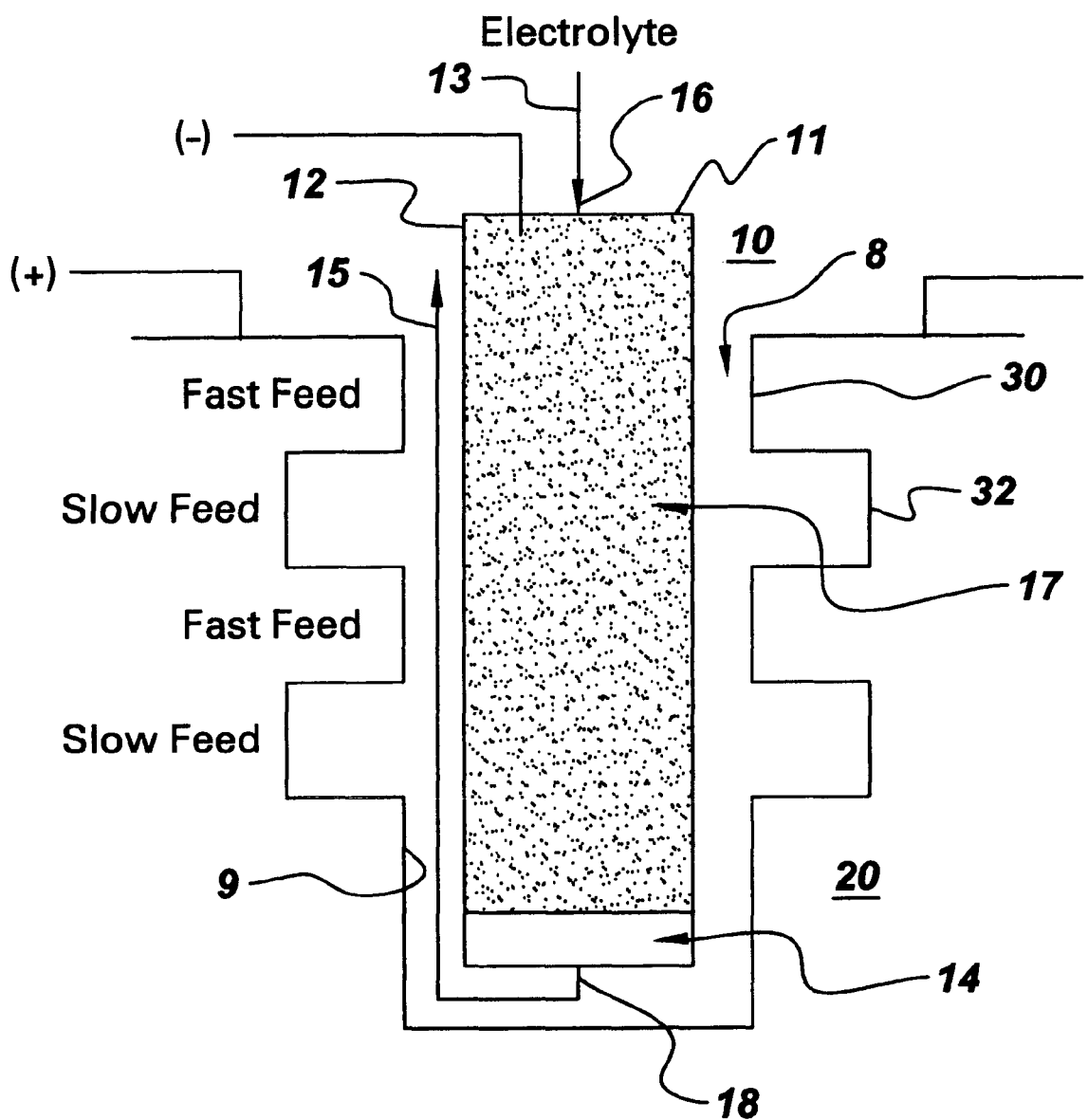

FIG. 8 is a schematic representation of a conventional shaped-tube electrochemical machining (STEM) electrode.

FIG. 9 is a schematic representation of an electrode coated with an insulating dielectric material in a pattern defining raised areas or ridges to be machined in a predrilled straight-walled hole.

FIG. 10 is a schematic representation of the hole shown in FIG. 9 after the raised areas have been formed.

Figure 11:
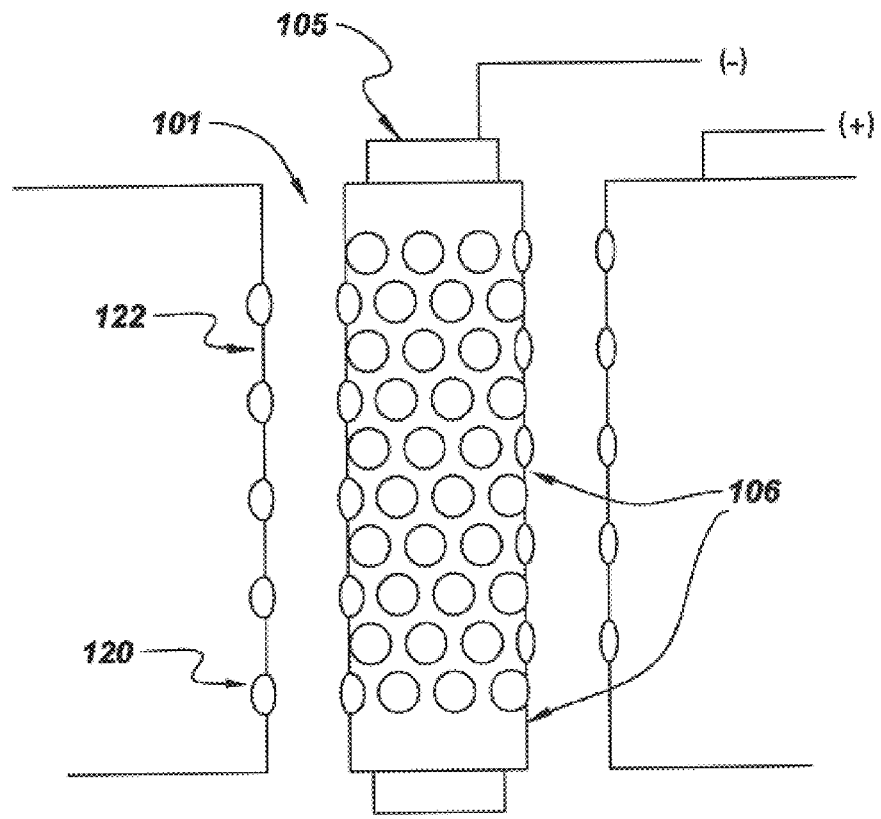

FIG. 11 is a schematic representation an electrode coated with an insulating dielectric material in a pattern defining concavities to be machined in a predrilled straight-walled hole.

Figure 12:
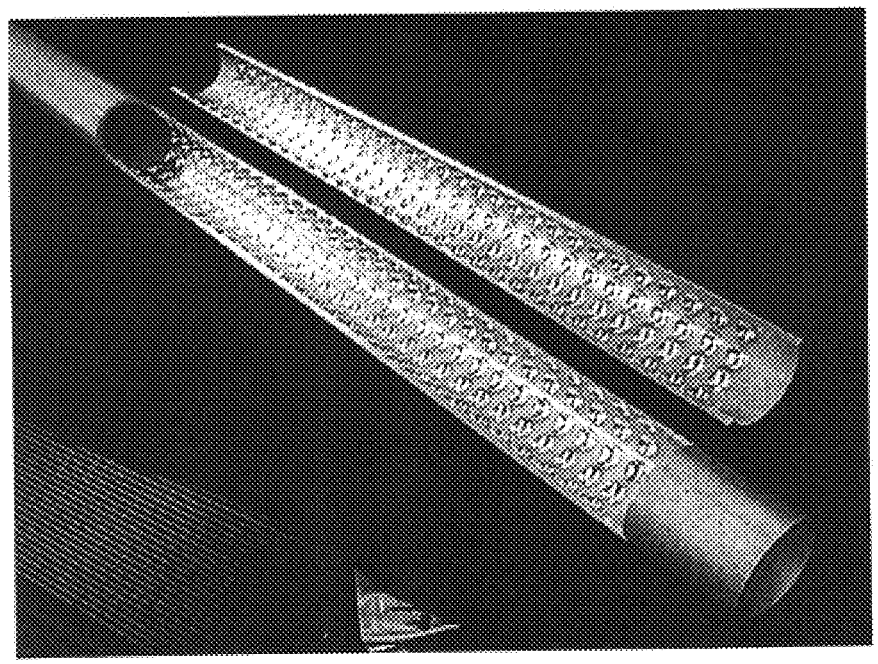

FIG. 12 is a picture of a test passage having concavities on the interior surface.

Figure 13:
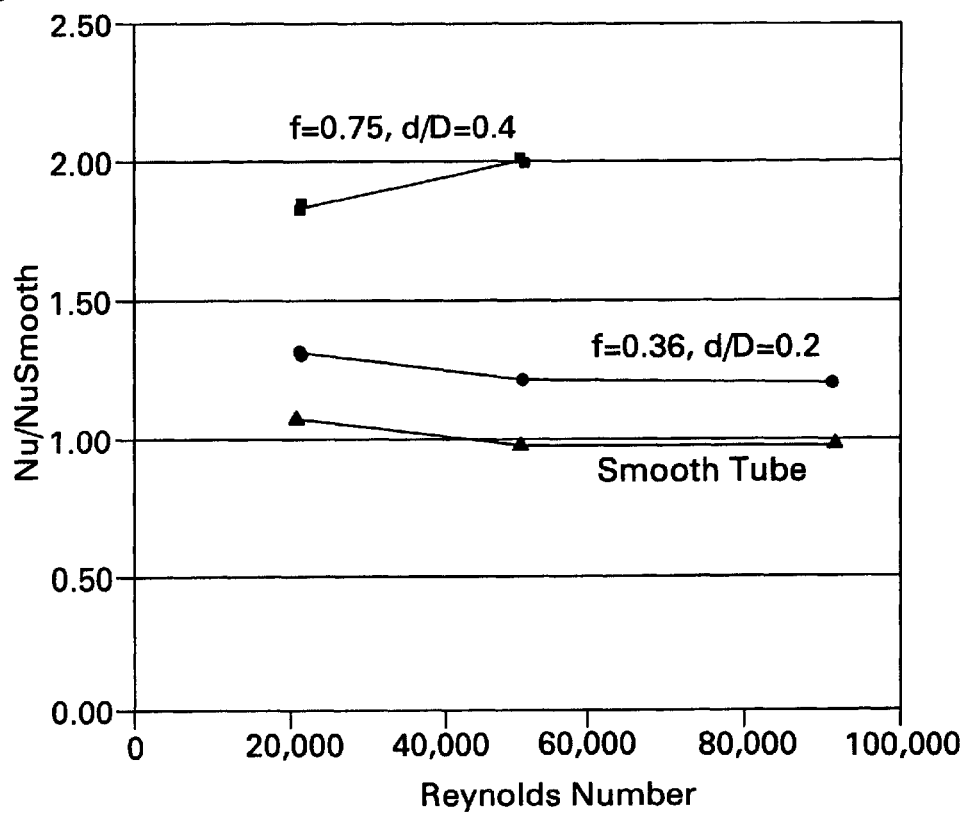

FIG. 13 is a graphical illustration of two dimpled tube heat transfer results compared against a baseline smooth tube.

Figure 14:
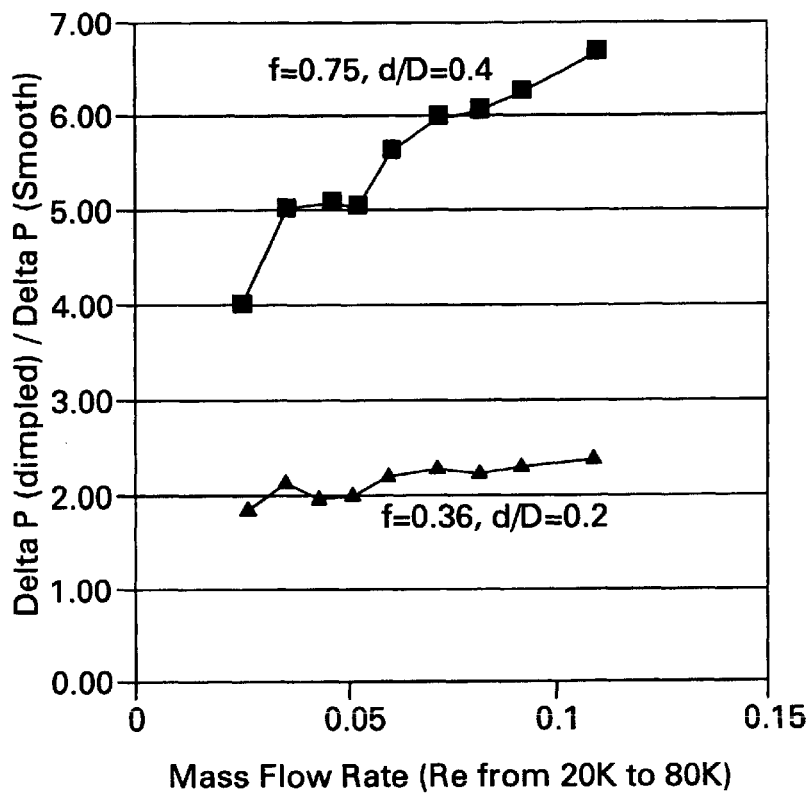

FIG. 14 is a graphical illustration of frictional enhancements for the dimpled turbes.

DETAILED DESCRIPTION OF THE INVENTION

A turbine portion 200, for example a turbine blade, for exposure in a hot fluid flow is depicted in FIG. 4. At least one internal cooling passage 202 (typically a plurality of passages) is disposed within turbine portion 200. A cooling fluid 204 is introduced within at least one cooling passage 202 to maintain the bulk temperature of the turbine portion 200 at some acceptable temperature level.

Figure 2:
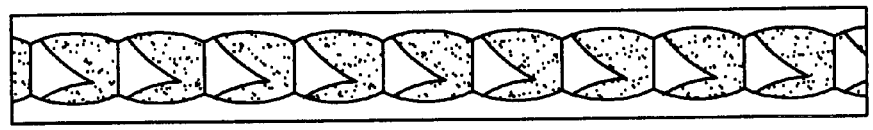
FIG. 2 depicts a cross-section of a known transverse rib roughened cooling passage.
Figure 3:
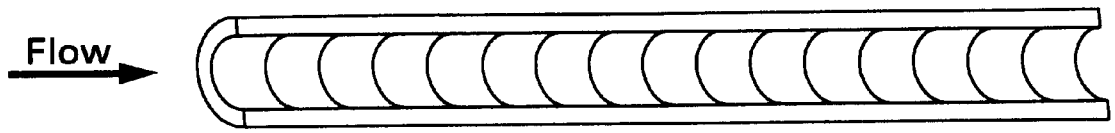
FIG. 3 depicts a cross-section of a known helical rib cooling passage.

In turbine engines, cooled hot gas path components typically use a variety of internal passages through which the cooling fluid is passed to maintain the bulk temperature of the part at some acceptable level. In many locations, these passages are of circular cross section. For such circular passages, there are two main types of surfaces used for heat transfer, smooth surfaces, (FIG. 1) and turbulated surfaces (FIG. 2) by the use of transverse rib rougheners. An additional possible heat transfer enhancement surface is the use of a helical rib element within the circular passage, but this type of feature is not amenable to conventional investment casting, electro-discharge machining, or electro-chemical machining methods (FIG. 3).

A plurality of concavities 206 are disposed on the interior surface of cooling passage 202. As used herein, the term "concavity" means a depression, indentation, dimple, pit, or any other type or shape of a discrete sinkhole.

The utilization of concavities 206 on cooling passage 202 within a turbine portion 200 is for example only and is not a limitation of the instant invention. In fact, concavities can be utilized within any type of internal cooling passage to improve heat transfer characteristics with low pressure drop.

In one embodiment, concavities 206 are formed on the interior surface of cooling passage 202 in an array pattern such that a spiral bulk fluid motion is obtained, similar to that, which would be formed by a helical rib, but without the rib. The concavity 206 surface pattern serves to enhance heat transfer to the same degree as the conventional rib rougheners, but with significantly less pressure loss due to friction. The spiral motion of the bulk cooling fluid 204 serves to recirculate central coolant to the heat transfer surface, thereby making the heat exchange process more effective than that for turbulated surfaces. This enhancement effect is in addition to the local vortex motion, and in fact is due to this vortex motion accumulating along the array pattern.

Figure 1:
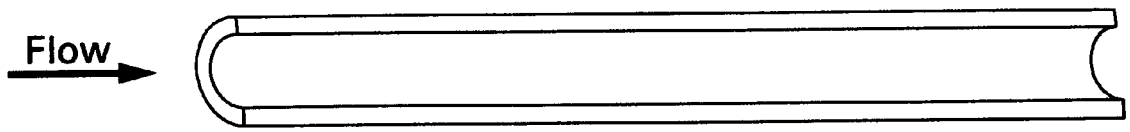
FIG. 1 depicts a cross-section of a known smooth circular cooling passage.

Typical circular cooling passages are shown in FIG. 1. Depending on the location and application of such passages for the purposes of cooling, the internal diameter of the passage may change. For any one cooling passage, however, the diameter typically remains constant over its length. In turbine cooling applications for power producing machines, the internal diameters of these passages may vary from about 0.080 inches up to about 0.250 inches. For propulsion turbines, the internal diameters of these passages may vary from about 0.020 inches up to about 0.120 inches. The specific design of turbulators (FIG. 2) or rib-rougheners is also variable, but the typical application provides a rib height between about 2% to about 20% of the diameter. The rib width is also subject to design variability.

Smooth passages may be fabricated by casting, EDM or ECM methods, or in some cases water jet machining. Transverse rib-roughened passages are typically formed by these methods for short length-to-diameter ratios, but long length-to-diameter ratios required EDM or ECM machining.

In one embodiment of the present invention, the internal surface of cooling passage 202, typically having a circular cross-section, is machined by a PECM method, as discussed in detail below, to form an array of concavities 206 as shown in FIG. 5. The depth (Y) of the concavities 206 typically remains constant through the length (L) of the passage 202, and is generally in the range between about 0.10 to about 0.30 times the concavity surface diameter (d), (though it could be as much as 0.50 times the concavity surface diameter (d)). Concavity 206 may be formed, for example, by a hemisphere, or by any the depression surface sector of the full hemisphere.

FIGS. 6 and 7 depict one embodiment of the concavities 208 in an unwrapped planar format, showing an example of the range of spacing and the angled lines (A, B and C) the concavities 206 can form, relative to the bulk flow direction 204. The lines labeled A, B, and C, respectively, show an example of the spiral or helical motion that the concavities can set up due to the vortex being generated from each individual concavity 206. This bulk motion results in a lower friction (pressure loss) than that from a rib-roughened passage that depends primarily upon turbulent mixing of the cooling fluid.

In one embodiment, each concavity 206 has a surface diameter (d) of less than $\pi$ D/3.3 but greater than $\pi$ D/20, where D is the diameter of a respective cooling passage 202. This means that no fewer than 3 and no more than 20 concavities 206 may be placed around the internal circumference of a circular cooling passage 202, having a diameter "D" at any one location substantially transverse to the flow direction.

The center-to-center spacing (X) of the concavities 206 in the array is typically about 1.1 to about 2 times the surface diameter (d) of the concavities 206.

Uniformly spaced concavities 206 can be utilized as shown in FIG. 6 or 7, with a staggered alignment between respective rows. The dimensions and spacing of a respective concavity 206 may change in relation to the location of the concavity 206 in the cooling passage 202 in order to match the thermal conditions present on the hot fluid side. This matching effect could also be achieved by variation of the concavity depth or diameter.

Typically, each concavity 206 has a sharp edge at the surface, but smoothed edges may be allowed in a manufacturing process. Additionally, concavities 206 may take on altered geometries (non-hemispherical).

Some of the benefits realized through the use of concavities 206 are maintained heat transfer cooling with a great reduction of frictional pressure loses (possibly 50% reduction or more). Furthermore, the concavities 206 design results in a system with less stress intensifiers than current machined turbulators (FIG. 2). Additionally, the heat transfer and cooling is more uniformly distributed over the surface of the cooling passages 202 through the use of the concavities 206.

To manufacture these concavities 206, a special pulse electrochemical machining (PECM) process can be used. This process typically uses a special tooling cathode that consists of a corrosion resistant metal tube (such as a titanium tube) and a patterned electrical insulation coating, as discussed in detail below. The coated tooling has a diameter smaller than the cooling hole size so the tooling cathode can be easily inserted into the cooling hole while maintaining a proper gap size for pressurized electrolyte to flow through. The tooling diameter can be for example, about 0.1 mm to about 0.5 mm smaller than the cooling hole diameter, for example. The coating typically has a thickness of about 0.015 mm to about 0.5 mm, for example. The coating is partially removed to expose certain areas of the metal tube according to the desired concavity 206 pattern. A numerically-controlled (NC) laser ablation station can be used to perform the coating patterning.

A dilute electrolyte such as 10% nitric acid or 10% sulfuric acid can be used. Non-acidic electrolytes can also be used with additives to prevent clogging that may be caused by metal hydroxide generation during machining. A proper inlet pressure should be applied, ranging between about 40 psi to about 120 psi.

A pulsed DC generator can be used with its positive terminal connected to the turbine portion 200 and its negative terminal to tooling. Short pulses are preferable to obtain a fine concavity resolution. Pulse duration ranges from about 100 nano-seconds to about 50 millisecond. Longer pulse duration (up to several seconds) can also be used for large holes with larger concavity geometry. Pulse intervals may be as long as several seconds to help heat dissipation and removal of sludge from machining area. The pulse duty factor may be in a range of about 0.2 to about 0.8. Voltage pulse amplitude is typically from about 5 volts to about 30 volts. The depth of the concavity is primarily determined by machining time. Empirical knowledge is needed to determine the machining time.

A better understanding of the electrochemical machining process may be gained by reference to the drawings. FIG. 8 is a schematic view illustrating a conventional shaped-tube electrochemical machining (STEM) electrode 10 and the operation of electrode 10 in electrochemically machining a hole 8 having interior walls 9 in an electrically conductive workpiece 20. Electrode 10 is typically a hollow metal tube 11 coated on an exterior surface with an insulating dielectric material 12 except at the end proximate to electrically conductive workpiece 20, where a band 14 of exposed metal is disposed. During the drilling operation, an electrolyte solution is continuously circulated through the body of electrode 10 and hole 8 while an electrical potential is applied between electrode 10 and workpiece 20. The solution is pumped to an inlet 16 at the end of electrode 10 opposite the end composed of band 14 of exposed metal, through the body of electrode 10, and through an end hole 18, which end hole 18 is enclosed by band 14 of exposed metal, through hole 8 and out of the upper end of hole 8, to be collected in a sump (not shown). The direction of electrolyte circulation is shown generally by arrows 13 and 15.

Electric current passes between band 14 of exposed metal electrode 10 and a portion of wall 9 of hole 8 directly adjacent to band 14 of exposed metal, resulting in removal of metal from that area of wall 9. Electrical insulation by dielectric material 12 blocks the current flow in coated areas 17 on the exterior surface of electrode 10, so that no deplating occurs in the areas of wall 9 opposite coated areas 17. The electrolyte solution dissolves the deplated metal and carries the dissolved metal out of hole 8.

The conventional method of forming raised areas such as ribs or ridges in hole 8 is to remove metal from areas of hole 8 adjacent to the desired location of the raised area to form bulbs 32 by a modified shaped-tube electrochemical machining (STEM) process. The cyclic dwelling method uses a cyclically varying feed rate to form bulbs 32 of diameter greater than that of the straight portion 30 of the hole. FIG. 8 shows the cyclic dwelling method schematically. The feed rate is relatively fast when drilling straight portion 30 of the hole, and relatively slow when drilling bulbs 32. Similarly, cyclic variation of voltage can cause formation of bulbs, or enhance the bulbing process. However, cyclic variation of voltage requires a sophisticated power output.

FIG. 9 depicts an electrode 100 in a predrilled hole 101 having a straight wall 102, of an electrically conductive workpiece 110. FIG. 10 shows electrode 100 in the same hole 101 after bulbs 120 and intervening raised areas, or ridges 122, have been created. In the embodiment shown in FIGS. 9 and 10, electrode 100 comprises a hollow cylindrical electrically conductive cylinder 105 coated with an electrically insulating coating 103 in a pattern having intervening areas 104 of exposed metal or conductive material on the exterior surface. The pattern of insulating coating 103 defines raised areas or ridges to be machined in predrilled hole 101. In this embodiment, the pattern is a series of rings 106. The (+) and (−) designations indicate pulsed voltage through the body of electrode 100 and workpiece 110. This process is better understood with reference to commonly assigned U.S. Pat. No. 6,303,193, entitled "Process for Fabricating a tool used in Electrochemical Machining," U.S. Pat. No. 6,290,461 entitled "Method and Tool for Electrochemical Machining," U.S. Pat. No. 6,200,429 entitled "Method and Tool for Electrochemical Machining," U.S. Pat. No. 6,267,868 entitled "Method and Tool for Electrochemical Machining," and U.S. Pat. No. 6,234,752 entitled "Method and Tool for Electrochemical Machining."

As shown in FIG. 10, areas of exposed conductive material 104 on the surface of electrode 100 define areas where bulbs 120 are formed by removal of metal from wall 102 of hole 101. Raised areas or ridges 122 are created in wall 102 of hole 101 where no deplating occurs in the vicinity of insulated portions 106 of the surface of electrode 100.

The operation of a shaped-tube electrochemical machining (STEM), or a pulse electrochemical machining with acid electrolyte, instrument with an electrode of the present invention is similar to that with a conventional electrode. Current is provided by coupling electrode 100 to a negative terminal of a STEM power supply (not shown) and workpiece 110 to a positive terminal. Electrode 100 is positioned inside smooth-walled hole 101 obtained from a previous drilling step. An electrolyte solution, which solution may be the same electrolyte as used in the first drilling step, is pumped into an end of hole 101 under pressure. Where electrode 100 is hollow and may contain outlets 116 for the electrolyte, the solution is pumped into inlet 112 of electrode 100. Solid electrodes can also be utilized. When a solid electrolyte is utilized, electrolyte flows over the space between the outer surface of the solid electrode and the predrilled hole.

The body of electrode 100 is typically composed of a conductive material, preferably titanium because of titanium's resistance to electrolytic action. The outer surface of the electrode body is covered with an electrically insulating coating 103 in a pattern that leaves some areas of the surface exposing the conductive material of the body. Coating 103 is made of a dielectric material, which dielectric material should preferably be smooth, of even thickness, tightly adhered to the surface of the body and free of pinholes or foreign material. Exemplary dielectric materials suitable for electrode 100 of the present invention include polyethylene, polytetrafluoro-ethylene, ceramics, and rubbers.

FIG. 11 depicts an electrode 100 for use in an electrochemical machining process comprising an electrically conductive cylinder 105 having an external surface 106 partially coated with an insulating coating 103 in a pattern defining concavities 206 to be formed on an internal surface of a predrilled hole in a workpiece.

Feasibility testing was performed for the concept of heat transfer enhancement using dimpled surface arrays on the internal surface of circular tubes, for example cooling passages. FIG. 12 shows one of these test passages with dimples machined on the interior.

The test matrix of geometries is shown in Table 1. In this table, dimple height-to-diameter ratio refers to the dimple depth at center relative to the dimple diameter at the surface. The dimple density 'f' is defined as the ratio of dimple area based on the dimple surface-diameter area, to the total surface area of a non-dimpled tube.

TABLE 1

| Ddimples [mm] | Space [mm] | # of Dimples | Height$_{dimples}$/D$_{dimples}$ | f % |
|---|---|---|---|---|
| 10 | 3.2994 | 9 | 0.2 | 35.6% |
| 10 | 1.9695 | 10 | 0.2 | 47.1% |
| 10 | 0.8813 | 11 | 0.2 | 61.4% |
| 10 | — | 12 | 0.2 | 79.1% |
| 10 | 3.2994 | 9 | 0.4 | 35.6% |
| 10 | 1.9695 | 10 | 0.4 | 47.1% |
| 10 | 0.8813 | 11 | 0.4 | 61.4% |
| 10 | — | 12 | 0.4 | 79.1% |
| 9.8 | 0.1746 | 12 | 0.2 | 74.5% |
| 9.8 | 0.1746 | 12 | 0.4 | 74.5% |

For the present purposes, only the cases of minimum and maximum dimple density 'f %' are shown. FIG. 13 shows two dimpled tube heat transfer results compared against a baseline smooth tube. As expected, the deeper dimples and higher density provide the higher enhancement level at about 100%, while the shallow dimples at lower density yield only about 20% enhancement. FIG. 14 shows the friction enhancements for these same dimpled tubes. In both cases, friction enhancement is elevated in a similar manner to that associated with turbulators in ducts. Even so, for applications involving very small diameter circular passages, eg. STEM holes in turbine buckets, the dimple performance with friction enhancement of 6 to 7 will be much better than turbulators which have friction enhancements of 12 to 18.

While only certain features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A turbine engine component comprising:
   a turbine portion exposable to a hot fluid flow;
   at least one internal cooling passage disposed within said turbine portion; and a plurality of concavities disposed upon a surface of said passage, wherein said plurality of concavities are configured in an array pattern to create a spiral bulk fluid motion.

2. A turbine engine component in accordance with claim 1, wherein said turbine portion is selected from the group consisting of a blade, a nozzle, an airfoil, a bucket, a vane or a shroud.

3. A turbine engine component in accordance with claim 1, wherein said at least one internal cooling passage is substantially axis-symmetric, about its own axis.

4. A turbine engine component in accordance with claim 1, wherein said cooling passage is at least one of circular in cross-section or non-circular in cross-section.

5. A turbine engine component in accordance with claim 1, wherein a diameter (D) of said at least one internal cooling passage remains substantially constant over the length of said cooling passage.

6. A turbine engine component in accordance with claim 1, wherein the depth (Y) of said concavities remains constant over the length (L) of said cooling passages.

7. A turbine engine component in accordance with claim 1, wherein the depth (Y) of said concavities is in the range between about 0.002 inches to about 0.125 inches.

8. A turbine engine component in accordance with claim 1, wherein the depth (Y) of said concavities is in the range between about 0.10 to about 0.50 times the surface diameter (d) of said concavities.

9. A turbine engine component in accordance with claim 1, wherein said concavities are at least one of hemispherical in shape or inverted and truncated conically shaped.

10. A turbine engine component in accordance with claim 1, wherein the shape of said concavities is any sector of a full hemisphere.

11. A turbine engine component in accordance with claim 1, wherein a respective concavity has a surface diameter (d) in the range between about $\pi D/20$ to about $\pi D/3.3$, where D is the diameter of said cooling passage.

12. A turbine engine component in accordance with claim 1, wherein said concavities have a center-to-center spacing (X) in the range between about 1.1 to about 2.0 times the surface diameter (d) of said concavities.

13. A turbine engine component in accordance with claim 1, wherein said concavities are uniformly spaced about a respective cooling passage.

14. A turbine engine component in accordance with claim 1, wherein the dimensions and spacing of said concavities changes in relation to the location of the concavity in said cooling passage to match the thermal requirements.

15. A turbine engine component in accordance with claim 1, wherein said concavities have a sharp edge at the surface of said cooling passage.

16. A machine component in accordance with claim 15, wherein said concavities are selected from the group consisting of depressions, indentation, dimples, pits and discrete sinkholes.

17. A process according to claim 16 wherein said electrode is stationary positioned in said cooling passage while said plurality of concavities are simultaneously formed with the electrode.

18. A process according to claim 16 wherein the workpiece comprises a turbine blade and the concavities comprise dimples.

19. A process according to claim 16 wherein the cooling passage has a non-circular cross section and further comprising positioning the electrode in a center of said cooling passage.

20. A turbine blade manufactured according to claim 19.

21. A turbine engine component in accordance with claim 1, wherein said concavities are selected from the group consisting of depressions, indentation, dimples, pits and discrete sinkholes.

22. A turbine engine component in accordance with claim 21, wherein said turbine engine is a power producing turbine engine and said diameter (D) is in the range between about 0.080 inches to about 0.250 inches.

23. A turbine engine component in accordance with claim 21, wherein said turbine engine is a propulsion producing turbine engine and said diameter (D) is in the range between about 0.0020 inches to about 0.125 inches.

24. A machine component comprising:
a portion exposable to a hot fluid flow;
at least one internal cooling passage disposed within said portion; and
a plurality of concavities disposed upon a surface of said at least one internal cooling passage, wherein said plurality of concavities are configured in an array pattern to create a spiral bulk fluid motion.

25. An electrochemical machining process for forming a plurality of concavities on a surface of at least one cooling passage disposed within a turbine engine component, comprising:
positioning in the at least one cooling passage an electrode coated with an insulating material in a pattern defining the plurality of concavities to be formed on said surface of said at least one cooling passage, and
machining the plurality of concavities on the surface of the at least one cooling passage by passing an electric current between the electrode positioned in the at least one cooling passage and the turbine engine component while circulating an electrolyte solution through the cooling passage, wherein said plurality of concavities are configured in an array pattern to create a spiral bulk fluid motion.

26. An electrode for use in an electrochemical machining process comprising an electrically conductive housing having an external surface partially coated with an insulating coating in a pattern defining concavities to be formed on an internal surface of a cooling passage, wherein said plurality of concavities, so defined and when formed, are configured in an array pattern to create a spiral bulk fluid motion.

27. A method of forming a plurality of dimples on a surface of at least one cooling passage of a turbine airfoil, said method comprising:
positioning in said at least one cooling passage an electrode coated with an insulating material in a pattern defining the plurality of dimples to be formed on said surface of said at least one cooling passage, and
machining the plurality of dimples on the surface of said at least one cooling passage by passing an electric current between the electrode positioned in said at least one cooling passage and the turbine airfoil while circulating an electrolyte solution through the cooling passage, wherein said plurality of dimples are configured in an array pattern to create a spiral bulk fluid motion.

* * * * *

UNITED STATES PATENT AND TRADEMARK OFFICE
CERTIFICATE OF CORRECTION

PATENT NO. : 6,644,921 B2
DATED : November 11, 2003
INVENTOR(S) : Bunker et al.

It is certified that error appears in the above-identified patent and that said Letters Patent is hereby corrected as shown below:

Column 3,
Line 29, please delete "by a hemisphere, or by any the depression surface sector of" and insert -- by a hemisphere, or by any depression in the surface sector of --

Signed and Sealed this

Twenty-eighth Day of December, 2004

JON W. DUDAS
*Director of the United States Patent and Trademark Office*